US012057652B2

(12) United States Patent
Sugimoto

(10) Patent No.: US 12,057,652 B2
(45) Date of Patent: Aug. 6, 2024

(54) TERMINAL FITTING

(71) Applicant: SUMITOMO WIRING SYSTEMS, LTD., Mie (JP)

(72) Inventor: Yuki Sugimoto, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 397 days.

(21) Appl. No.: 17/572,745

(22) Filed: Jan. 11, 2022

(65) Prior Publication Data

US 2022/0231442 A1 Jul. 21, 2022

(30) Foreign Application Priority Data

Jan. 18, 2021 (JP) ................................ 2021-005550

(51) Int. Cl.
*H01R 13/00* (2006.01)
*H01R 13/11* (2006.01)
*H01R 13/24* (2006.01)
*H01R 13/40* (2006.01)
*H01R 13/502* (2006.01)

(52) U.S. Cl.
CPC ....... *H01R 13/113* (2013.01); *H01R 13/2464* (2013.01); *H01R 13/40* (2013.01); *H01R 13/502* (2013.01)

(58) Field of Classification Search
CPC .. H01R 13/113; H01R 13/2464; H01R 13/40; H01R 13/502
See application file for complete search history.

(56) References Cited

U.S. PATENT DOCUMENTS 5,630,738 A * 5/1997 Ito ........................ H01R 13/113 439/852
6,116,970 A * 9/2000 Yamamoto ........... H01R 13/113 439/852
6,428,365 B1 * 8/2002 Yamamoto ........... H01R 13/113 439/852
6,544,080 B1 * 4/2003 Yamamoto ........... H01R 13/113 439/852
7,470,159 B2 * 12/2008 Hara .................... H01R 13/113 439/852
7,544,106 B2 * 6/2009 Muneyasu ........... H01R 13/113 439/852
9,608,353 B1 * 3/2017 Ang ....................... H01R 13/26
2023/0130951 A1 * 4/2023 Sugimoto ............ H01R 13/187 439/751

FOREIGN PATENT DOCUMENTS

JP 2014-082158 A 5/2014

* cited by examiner

*Primary Examiner* — Phuong Chi Thi Nguyen
(74) *Attorney, Agent, or Firm* — Venjuris, P.C.

(57) ABSTRACT

A terminal fitting T includes a tubular body portion, a first resilient piece and a second resilient piece provided inside the body portion, a first contact point portion provided on the first resilient piece and configured to contact a tab portion, and a second contact point portion provided on the second resilient piece and configured to contact the tab portion. The first resilient piece extends in a first direction along a length direction of the tab portion from a first fixed end fixed to the body portion and is resiliently displaceable with a fulcrum of the first fixed end as a center. The second resilient piece extends in a second direction opposite to the first direction from a second fixed end fixed to the first resilient piece and is resiliently displaceable with a fulcrum of the second fixed end as a center.

3 Claims, 9 Drawing Sheets

TERMINAL FITTING

CROSS-REFERENCE TO RELATED APPLICATIONS

This application is based on and claims priority from Japanese Patent Application No. 2021-005550, filed on Jan. 18, 2021, with the Japan Patent Office, the disclosure of which is incorporated herein in their entireties by reference.

TECHNICAL FIELD

The present disclosure relates to a terminal fitting.

BACKGROUND

Conventionally, a terminal fitting is known which includes a tubular body portion. A tab portion of a mating terminal fitting is inserted into the body portion from front. For example, a body portion of a terminal fitting described in Japanese Patent Laid-open Publication No. 2014-082158 includes three resilient contact pieces. The three resilient contact pieces are arranged side by side in a lateral direction. The three resilient contact pieces are independently resiliently displaced in a vertical direction. A contact point portion is provided on the upper surface of each resilient contact piece. Out of three contact point portions 21, 22, the one in a lateral center contacts a tip side of the tab portion. Out of the three contact point portions 21, 22, those on both lateral sides contact the tab portion on a side more rearward than the contact point portion in the middle. The tab portion is supported by the three contact point portions 21, 22, whereby the rattling of the tab portion in the body portion is suppressed.

SUMMARY

If the tip side of the tab portion of the mating terminal fitting is displaced downward (in a direction to press the contact point portion) with the terminal fitting and the mating terminal fitting connected, contact loads of the contact point portions on the rear side are reduced. On the other hand, if the rear side of the tab portion of the mating terminal fitting is displaced downward, a contact load of the contact point portion on the tip side is reduced. To more reliably prevent the rattling of the tab portion in the body portion, there has been a demand to suppress such a reduction in contact load.

Accordingly, the present disclosure aims to provide a terminal fitting which can suppress a reduction in contact load even if a tab portion is displaced.

The present disclosure is directed to a terminal fitting with a tubular body portion, a first resilient piece and a second resilient piece provided inside the body portion, a first contact point portion provided on the first resilient piece, the first contact point portion contacting a tab portion of a mating terminal fitting, and a second contact point portion provided on the second resilient piece, the second contact point portion contacting the tab portion, wherein the first resilient piece extends in a first direction along a length direction of the tab portion from a first fixed end fixed to the body portion and is resiliently displaceable with a fulcrum of the first fixed end as a center, the second resilient piece extends in a second direction opposite to the first direction from a second fixed end fixed to the first resilient piece and is resiliently displaceable with a fulcrum of the second fixed end as a center, the first contact point portion is located on a side closer to a tip in the first direction of the first resilient piece than the fulcrum of the second fixed end, and the second contact point portion is located on a side closer to a tip in the second direction of the second resilient piece than the fulcrum of the first fixed end.

According to the present disclosure, a terminal fitting can be provided which can suppress a reduction in contact load even if a tab portion is displaced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
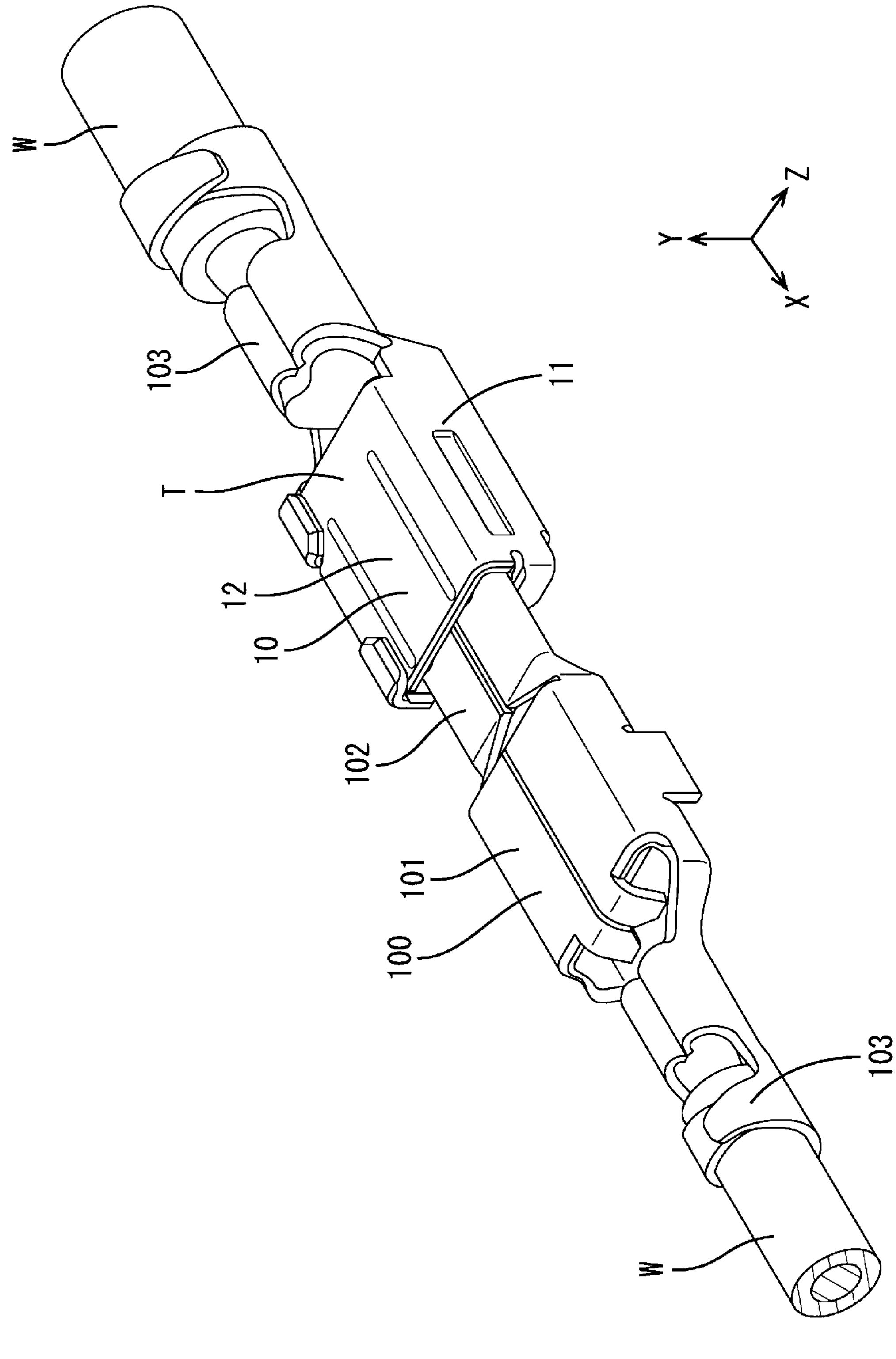
FIG. 1 is a perspective view of a terminal fitting according to an embodiment showing a state connected to a mating terminal fitting.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The terminal fitting of the present disclosure includes a tubular body portion, a first resilient piece and a second resilient piece provided inside the body portion, a first contact point portion provided on the first resilient piece, the first contact point portion contacting a tab portion of a mating terminal fitting, and a second contact point portion provided on the second resilient piece, the second contact point portion contacting the tab portion, wherein the first resilient piece extends in a first direction along a length direction of the tab portion from a first fixed end fixed to the body portion and is resiliently displaceable with a fulcrum of the first fixed end as a center, the second resilient piece extends in a second direction opposite to the first direction from a second fixed end fixed to the first resilient piece and is resiliently displaceable with a fulcrum of the second fixed end as a center, the first contact point portion is located on a side closer to a tip in the first direction of the first resilient piece than the fulcrum of the second fixed end, and the second contact point portion is located on a side closer to a tip in the second direction of the second resilient piece than the fulcrum of the first fixed end.

According to this configuration, if the tab portion is displaced in a direction to press the first contact point portion, the first resilient piece can be mainly resiliently displaced with the fulcrum of the first fixed end as a center and the second contact point portion can be displaced toward the tab portion like a seesaw. Thus, a reduction in the contact load of the tab portion and the second contact point portion can be suppressed. On the other hand, if the tab portion is displaced in a direction to press the second contact point portion, the second resilient piece can be mainly resiliently displaced with the fulcrum of the second fixed end as a center and the first contact point portion can be displaced toward the tab portion like a seesaw. Thus, a reduction in the contact load of the tab portion and the first contact point portion can be suppressed. Therefore, even if the tab portion is displaced, a reduction in contact load can be reduced.

(2) Preferably, the first resilient piece includes a plurality of extending portions extending in the first direction and a linking portion linking tip sides in the first direction of the plurality of extending portions, and a plurality of the first contact point portions are provided on the linking portion. According to this configuration, since an interval between the first contact point portions can be made smaller than that between the extending portions of the first resilient piece, a tab portion having a small width can be dealt with.

(3) Preferably, the body portion includes side walls arranged on both sides of the tab portion in a direction intersecting the length direction, and the side walls include projecting portions projecting toward the first and second resilient pieces. According to this configuration, if the tip side of the tab portion swings in the direction intersecting the length direction, a side edge of the tab portion contacts the projecting portion and a contact point of the side edge of the tab portion and the projecting portion can serve as a center of a swinging movement of the tip of the tab portion. In this way, distances between the respective contact points and the center of the swinging movement can be larger than those when a center of a swinging movement of a tab portion is located inside a plurality of contact point portions. Therefore, a load necessary to swing the tip of the tab portion can be increased, wherefore the swinging movement of the tip of the tab portion can be suppressed.

Details of Embodiment of Present Disclosure

A specific example of a terminal fitting of the present disclosure is described below with reference to the drawings. Note that the present invention is not limited to these illustrations and is intended to be represented by claims and include all changes in the scope of claims and in the meaning and scope of equivalents.

As shown in FIG. 1, a terminal fitting T is connected to a mating terminal fitting 100. The terminal fitting T is for large current. The terminal fitting T is a female terminal fitting, and the mating terminal fitting 100 is a male terminal fitting. The terminal fitting T and the mating terminal fitting 100 are formed by press-working a metal plate excellent in conductivity. The terminal fitting T and the mating terminal fitting 100 are respectively connected to ends of wires W. The terminal fitting T and the mating terminal fitting 100 include barrel portions 103 to be crimped to ends of the wires W.

The mating terminal fitting 100 includes a body portion 101 and a tab portion 102. The tab portion 102 projects from the body portion 101. The tab portion 102 is formed by folding a plate-like member extending from the body portion 101 into two (see FIG. 2). The tab portion 102 is resiliently supported on a resilient piece 20 of the terminal fitting T.

Figure 2:
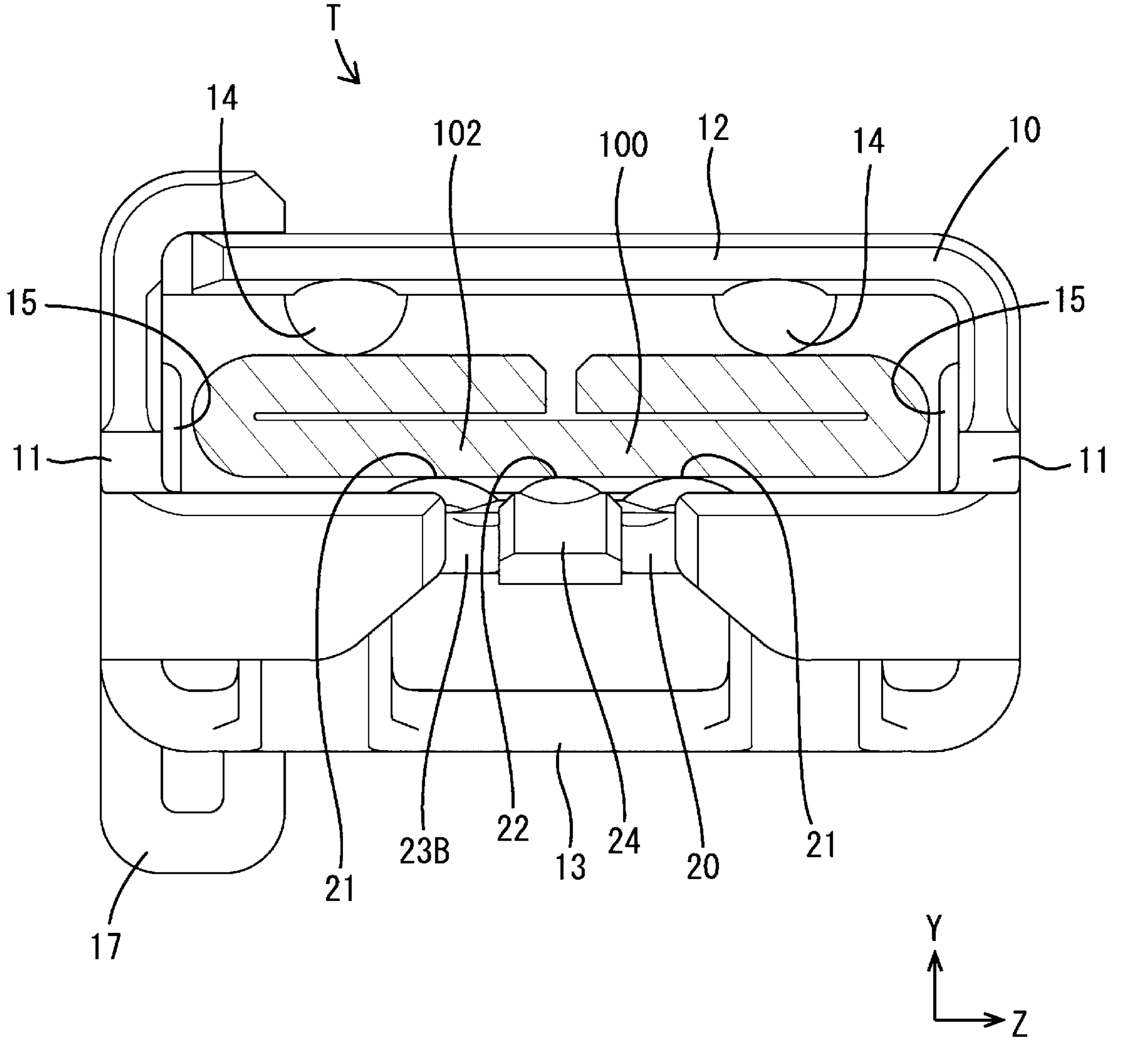
FIG. 2 is a front view showing a body portion in a state where a tab portion of the mating terminal fitting is inserted.

In the following description, in each constituent member of the terminal fitting T, a forward direction side (side where the mating terminal fitting 100 is connected) of an X axis of FIG. 1 is referred to as a front side, a negative direction side (side where the wire W is connected) of the X axis of FIG. 1 is referred to as a rear side, a forward direction side (side where the tab portion 102 is arranged with respect to the resilient piece 20) of a Y axis of FIG. 2 is referred to as an upper side, a negative direction side (side opposite to the side where the tab portion 102 is arranged with respect to the resilient piece 20) of the Y axis of FIG. 2 is referred to as a lower side, a forward direction side (right side when the terminal fitting T is viewed from front) of a Z axis of FIG. 2 is referred to as a right side, and a negative direction side (left side when the terminal fitting T is viewed from front) of the Z axis of FIG. 2 is referred to as a left side.

As shown in FIG. 2, the terminal fitting T includes a body portion 10 into which the tab portion 102 is inserted. The body portion 10 is in the form of a rectangular tube open on both front and rear sides. The body portion 10 is shaped to have a width (dimension in the lateral direction) larger than a height (dimension in the vertical direction). A width of a front opening of the body portion 10 is larger than that of the tab portion 102.

The body portion 10 includes a pair of left and right side walls 11, an upper wall 12 and a lower wall 13. The left and right side walls 11 are parallel. The left and right side walls 11 are arranged on both left and right sides (both sides in a direction intersecting a length direction) of the tab portion 102 with the terminal fitting T and the mating terminal fitting 100 connected. The upper and lower walls 12, 13 are parallel. Here, parallel may not be perfectly parallel.

The upper wall 12 includes two ridge portions 14. One ridge portion 14 is provided on each of left and right sides of the body portion 10. The pair of ridge portions 14 are bilaterally symmetrically arranged with respect to a lateral center position of the body portion 10. The ridge portions 14 extend in a front-rear direction (see FIG. 4). The two ridge portions 14 are parallel. Here, parallel may not be perfectly parallel.

Figure 3:
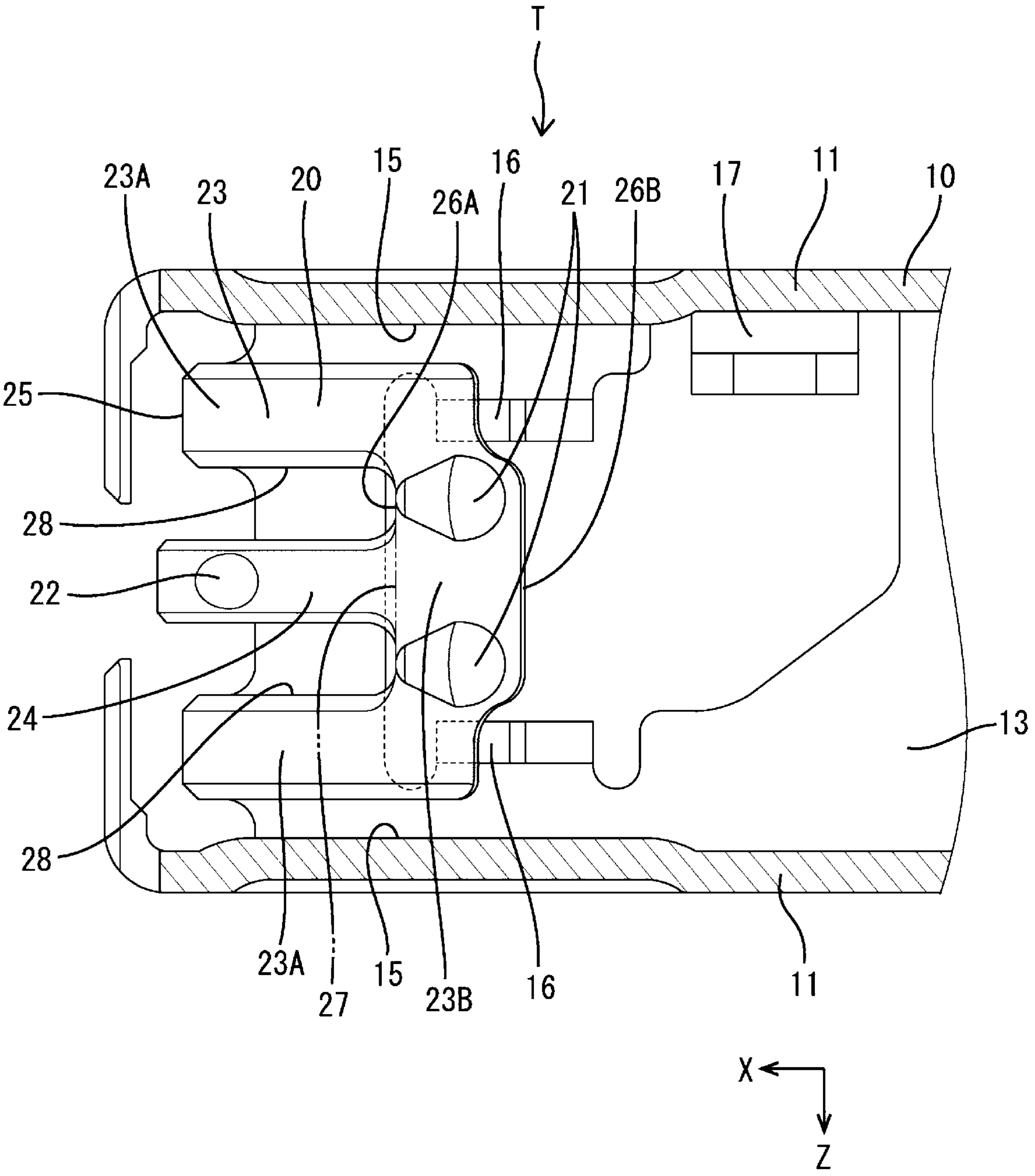
FIG. 3 is a plan view in section showing the inside of the body portion.
Figure 4:
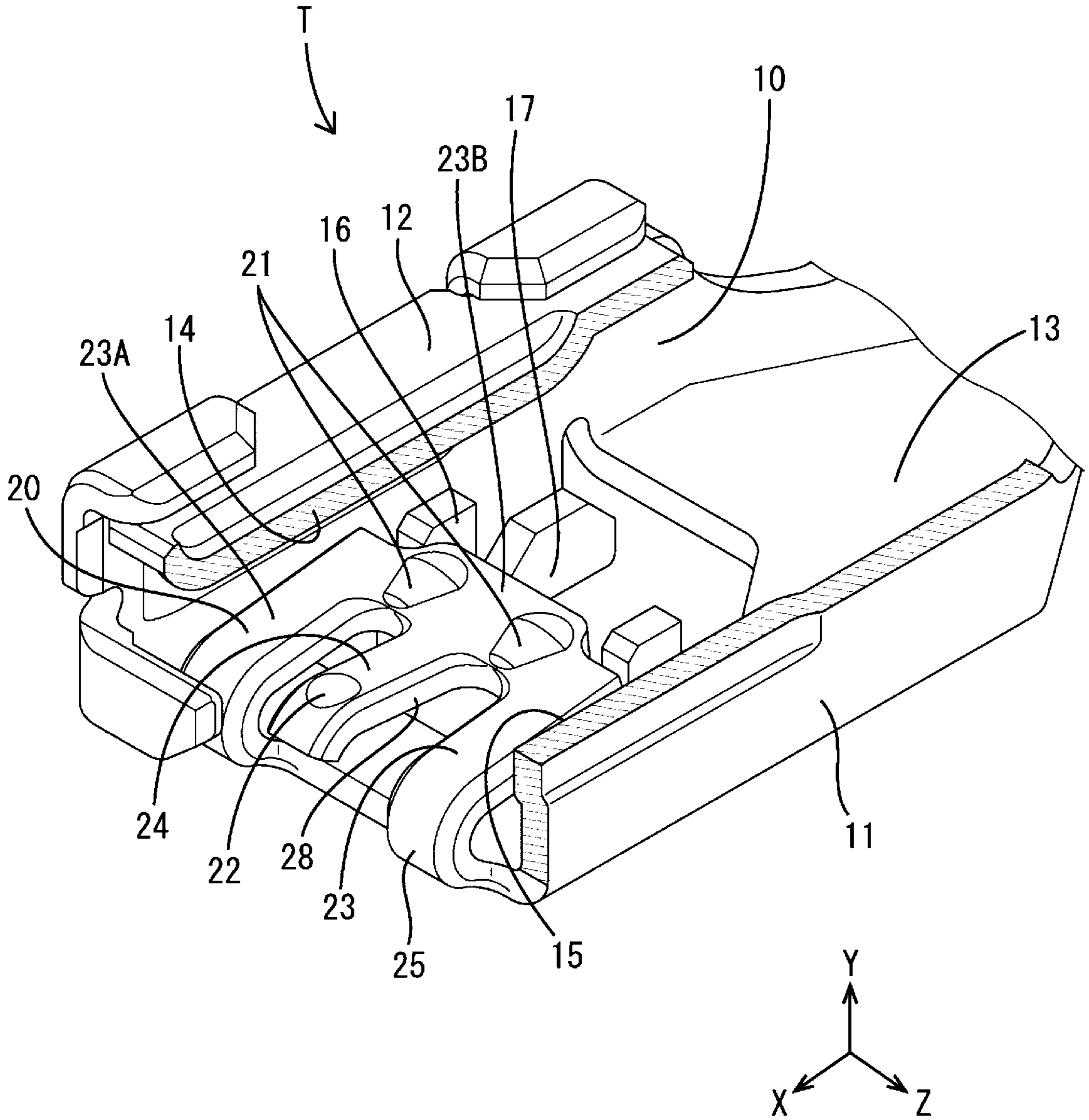
FIG. 4 is a perspective view partly in section showing the inside of the body portion.

As shown in FIG. 3, the side wall 11 includes a projecting portion 15 projecting toward the resilient piece 20 in the body portion 10. The projecting portion 15 is formed by striking a part of the body portion 10. The projecting portion 15 has a trapezoidal shape slightly projecting inwardly of the body portion 10. The projecting portions 15 are provided on the both left and right side walls 11. The projecting portions 15 extend in the front-rear direction. The projecting portions 15 are located on left and right sides of a region where the resilient piece 20 is arranged. The front ends of the projecting portions 15 are located near the front end of the resilient piece 20 in the front-rear direction. The rear ends of the projecting portions 15 are located rearward of the rear end of the resilient piece 20 in the front-rear direction. The projecting portions 15 are bilaterally symmetrical with respect to a lateral center of the body portion 10. As shown in FIG. 4, the projecting portions 15 are formed in vertically central parts of the side walls 11. The projecting portions 15 are located substantially at the same height as the tab portion 102 inserted into the body portion 10.

As shown in FIG. 3, excessive deflection preventing portions 16 are provided inside the body portion 10. A pair of left and right excessive deflection preventing portions 16 are provided. The excessive deflection preventing portions 16 are in the form of walls facing the side walls 11. The excessive deflection preventing portions 16 are formed by forming cuts in the lower wall 13 and raising cut parts upward. The excessive deflection preventing portions 16 are located below the resilient piece 20. A stabilizer 17 is provided behind the excessive deflection preventing portions 16. The terminal fitting T is inserted in a correct direction into an unillustrated housing by the stabilizer 17.

As shown in FIG. 3, the resilient piece 20 is provided inside the body portion 10. The resilient piece 20 is resiliently displaced in the vertical direction inside the body portion 10. The resilient piece 20 includes three contact point portions 21, 22. The three contact point portions 21, 22 contact the tab portion 102. Out of the three contact point portions 21, 22, two are first contact point portions 21 and one is a second contact point portion 22. The two first contact point portions 21 are laterally arranged side by side. The second contact point portion 22 is located forward of the first contact point portions 21. A clearance smaller than a thickness (dimension in the vertical direction) of the tab portion 102 is formed between the three contact point portions 21, 22 and the ridge portions 14 of the upper wall 12 in a state where the resilient piece 20 is not resiliently displaced.

As shown in FIG. 3, the resilient piece 20 includes a first resilient piece 23 and a second resilient piece 24. Since the first and second resilient pieces 23, 24 are integrally formed, a gap between the three contact point portions 21, 22 and the ridge portions 14 can be easily controlled.

The first resilient piece 23 includes two extending portions 23A and a linking portion 23B. The linking portion 23B links rear end parts of the two extending portions 23A to each other. The linking portion 23B extends in the lateral direction. A width (dimension in the front-rear direction) of the linking portion 23B is larger than a width (dimension in the lateral direction) of either one of the left and right extending portions 23A. The extending portions 23A of the first resilient piece 23 and the second resilient piece 24 are shaped to be long in the front-rear direction. The extending portions 23A of the first resilient piece 23 and the second resilient piece 24 are arranged laterally side by side. The extending portions 23A of the first resilient piece 23 and the second resilient piece 24 extend in parallel. Here, parallel may not be perfectly parallel.

Figure 5:
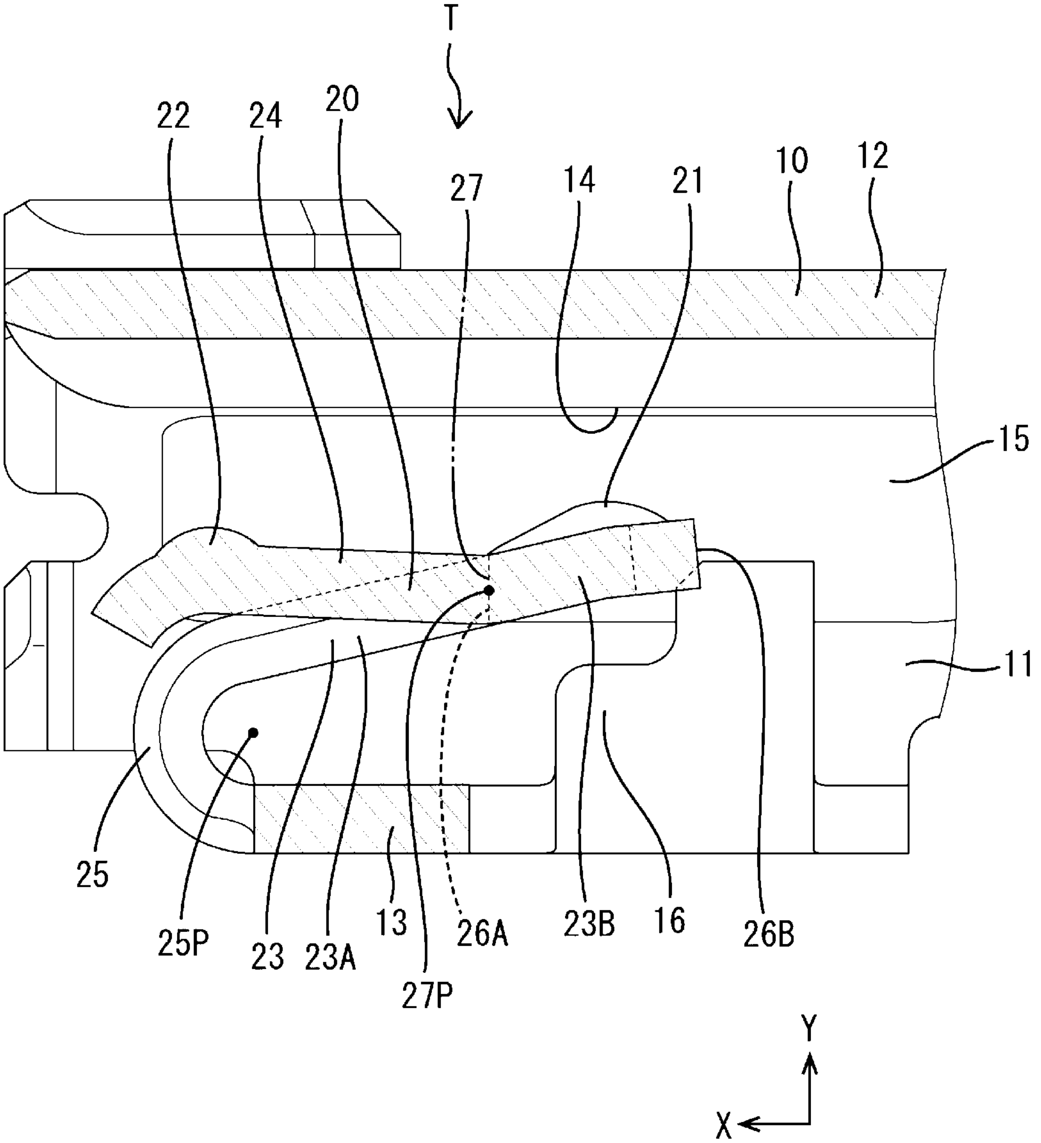
FIG. 5 is a longitudinal section showing the inside of the body portion.

As shown in FIG. 5, the extending portion 23A of the first resilient piece 23 extends rearward (first direction) from a first fixed end 25 fixed to the body portion 10. The extending portion 23A extends obliquely upward from the first fixed end 25 in a state where the extending portion 23A is not resiliently displaced. The first fixed end 25 is bent upward from the front edge of the lower wall 10 of the body portion 10. The first fixed end 25 is curved into an arc shape. A fulcrum 25P of the first fixed end 25 is a virtual point serving as a center of a resilient displacement of the first resilient piece 23. Specifically, the fulcrum 25P of the first fixed end 25 is a center point of the arched first fixed end 25. The position of the fulcrum 25P of the first fixed end 25 is not limited to the position shown in FIG. 5. The fulcrum 25P of the first fixed end 25 can be located at the position shown in FIG. 5 or near this position. For example, the fulcrum 25P of the first fixed end 25 can be located in the plate constituting the first fixed end 25.

A rear end part of the first resilient piece 23 is a free end. The first resilient piece 23 is cantilevered. The first resilient piece 23 is resiliently displaced in the vertical direction with the fulcrum 25P of the first fixed end 25 as a center. The rear end part of the first resilient piece 23 is located in a formation range of the projecting portions 15 in the vertical direction.

The linking portion 23B is provided with the two first contact point portions 21. The respective first contact point portions 21 are formed between a front edge 26A and a rear edge 26B of the linking portion 23B. The first contact point portions 21 are arranged at positions shifted in the lateral direction from the extending portions 23A. The two first contact point portions 21 are located inwardly of the two extending portions 23A in the lateral direction. An interval in the lateral direction between the two contact point portions 21 is narrower than that between the two extending portions 23A. In this way, the two first contact point portions 21 can be brought into contact with even a tab portion having a width narrower than the interval in the lateral direction between the extending portions 23A. The tops of the first contact point portions 21 are located on an uppermost end in the first resilient piece 23 (see FIG. 5).

As shown in FIG. 3, the second resilient piece 24 extends forward (second direction) from a second fixed end 27 fixed to the linking portion 23B. The second fixed end 27 is located on rear end parts of the extending portions 23A via the linking portion 23B. The second fixed end 27 is located in a lateral center of the linking portion 23B. A width (dimension in the lateral direction) of the second resilient piece 24 is smaller than those (dimensions in the lateral direction) of the extending portions 23A of the first resilient piece 23.

Slits 28 are formed between the second resilient piece 24 and the extending portions 23A of the first resilient piece 23. The first contact point portions 21 are provided within widths of the slits 28. The first contact point portions 21 are located between the extending portions 23A and the second resilient piece 24 in the lateral direction.

As shown in FIG. 5, the second resilient piece 24 extends obliquely upward from the second fixed end 27 in a state where the second resilient piece 24 is not resiliently displaced. A fulcrum 27P of the second fixed end 27 is at a position serving as a center of a resilient displacement of the second resilient piece 24. A front end part of the second resilient piece 24 is a free end. In other words, the second resilient piece 24 is cantilevered. The second resilient piece 24 is resiliently displaced in the vertical direction with the fulcrum 27P of the second fixed end 27 as a center. The front end part of the second resilient piece 24 is bent downward. The front end of the second resilient piece 24 is located forward of the first fixed end 25 of the first resilient piece 23.

As shown in FIG. 3, the second resilient piece 24 is provided with one second contact point portion 22. The second contact point portion 22 is smaller than the first contact point portions 21 in a plan view from above. The second contact point portion 22 is located forward of the first contact point portions 21. The second contact point portion 22 is located substantially in the middle between the two first contact point portions 21 in the lateral direction.

As shown in FIG. 5, the second contact point portion 22 is located forward (toward the tip side in the second direction) of the fulcrum 25P of the first fixed end 25. The second contact point portion 22 is provided rearward of the front end of the second resilient piece 24. The second contact point portion 22 is located in the formation range of the projecting portions 15 in the vertical direction. The top of the second contact point portion 22 is located on an uppermost end in the second resilient piece 24.

The second contact point portion 22 and the first contact point portions 21 are arranged on front and rear sides with respect to the fulcrum 25P of the first fixed end 25 as a center. Accordingly, the second contact point portion 22 and the first contact point portions 21 are displaced in a seesaw manner with the fulcrum 25P of the first fixed end 25 as a center. Specifically, if the first contact point portions 21 are lowered with the fulcrum 25P of the first fixed end 25 as a center, the second contact point portion 22 is raised.

The second contact point portion 22 and the first contact point portions 21 are arranged on front and rear sides with respect to the fulcrum 27P of the second fixed end 27 as a center. Accordingly, the first contact point portions 21 and the second contact point portion 22 are displaced in a seesaw manner with the fulcrum 27P of the second fixed end 27 as a center. Specifically, if the second contact point portion 22 is lowered with the fulcrum 27P of the second fixed end 27 as a center, the first contact point portions 21 are raised.

Figure 6:
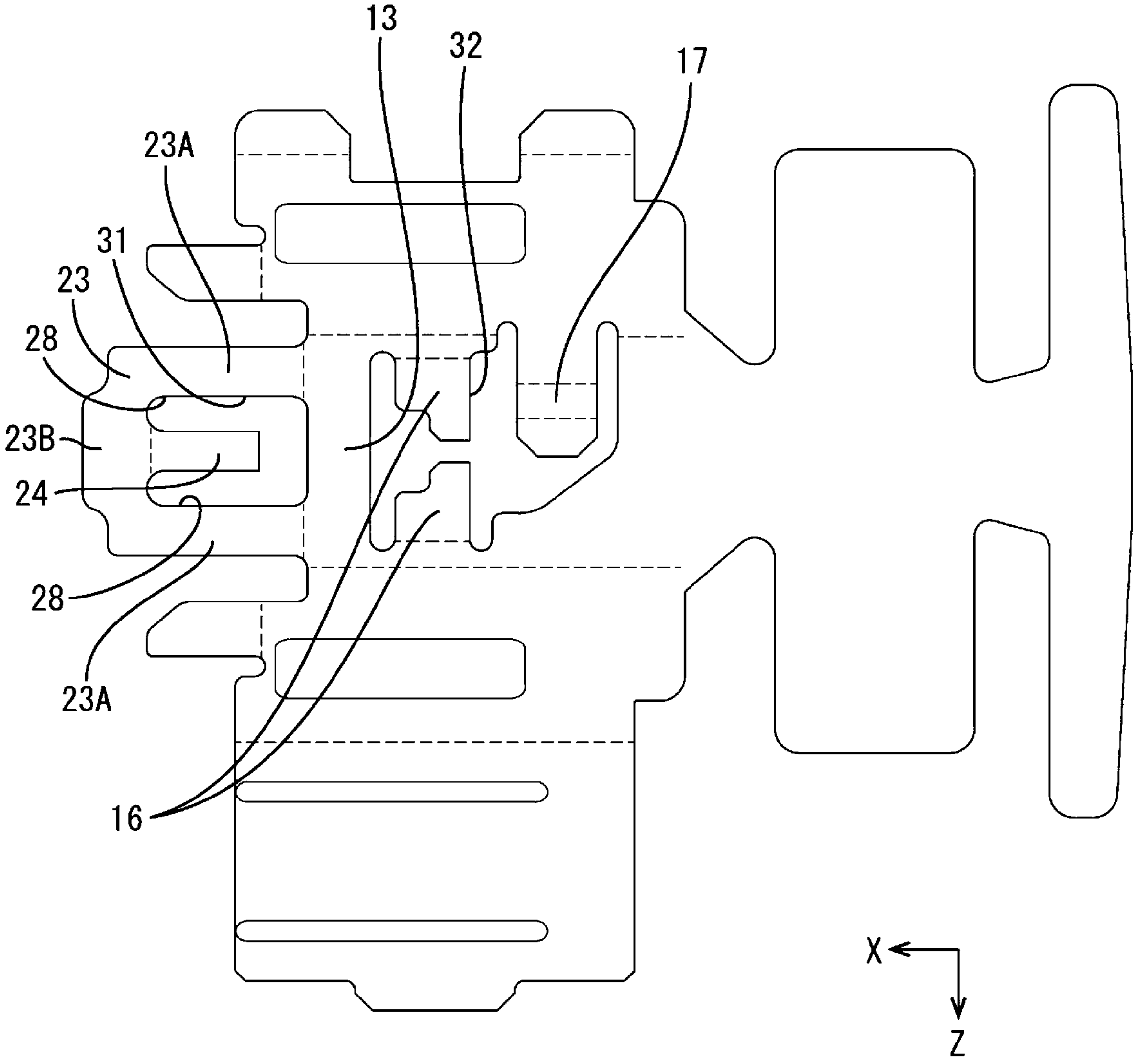
FIG. 6 is a development showing a developed state of the terminal fitting.

FIG. 6 shows a developed state of the terminal fitting T before being bent. The terminal fitting T in the developed state is formed with two punch holes 31, 32. The first punch hole 31 is punched out between parts which will become the extending portions 23A of the first resilient piece 23 and a part which will become the second resilient piece 24. A part which will become the first resilient piece 23 extends forward from the front edge of a part which will become the lower wall 13 of the body portion 10. Front end parts of the parts which will become the extending portions 23A of the first resilient piece 23 are linked by a part which will become the linking portion 23B. The part which will become the second resilient piece 24 extends rearward from the rear edge of the part which will become the linking portion 23B. The first punch hole 31 divides the part which will become the lower wall 13, the part which will become the first resilient piece 23 and the part which will become the second resilient piece 24. The first punch hole 31 includes parts which will become the slits 28. Since the first punch hole 31 is larger than elongated slits in the case of dividing and forming three resilient pieces one by one, the strength of a mold can be improved. The second punch hole 32 is formed in the part which will become the lower wall 13 of the body portion 10. Parts which will become the excessive deflection preventing portion 16 and the stabilizer 17 are formed by the second punch hole 32.

Next, the connection of the terminal fitting T and the mating terminal fitting 100 is described. With the terminal fitting T and the mating terminal fitting 100 properly connected, the tab portion 102 is sandwiched between the two ridge portions 14 and the three contact point portions 21, 22 as shown in FIG. 2. The left and right ridge portions 14 simultaneously contact the upper surface of the tab portion 102. The two first contact point portions 21 and the one second contact point portion 22 simultaneously contact the lower surface of the tab portion 102. The tab portion 102 is held in contact with the two ridge portions 14 and the three contact point portions 21, 22 by resilient forces of the first and second resilient pieces 23, 24.

With the terminal fitting T and the mating terminal fitting 100 properly connected, the tab portion 102 may vertically vibrate inside the body portion 10. The vertical vibration of the tab portion 102 means the alternate repetition of a posture in which the tab portion 102 is so inclined that one of the tip side of the tab portion 102 and the side of the tab portion 102 behind the tip is located on an upper side and the other is located on a lower side and an opposite posture as shown in FIGS. 7 and 8.

Figure 7:
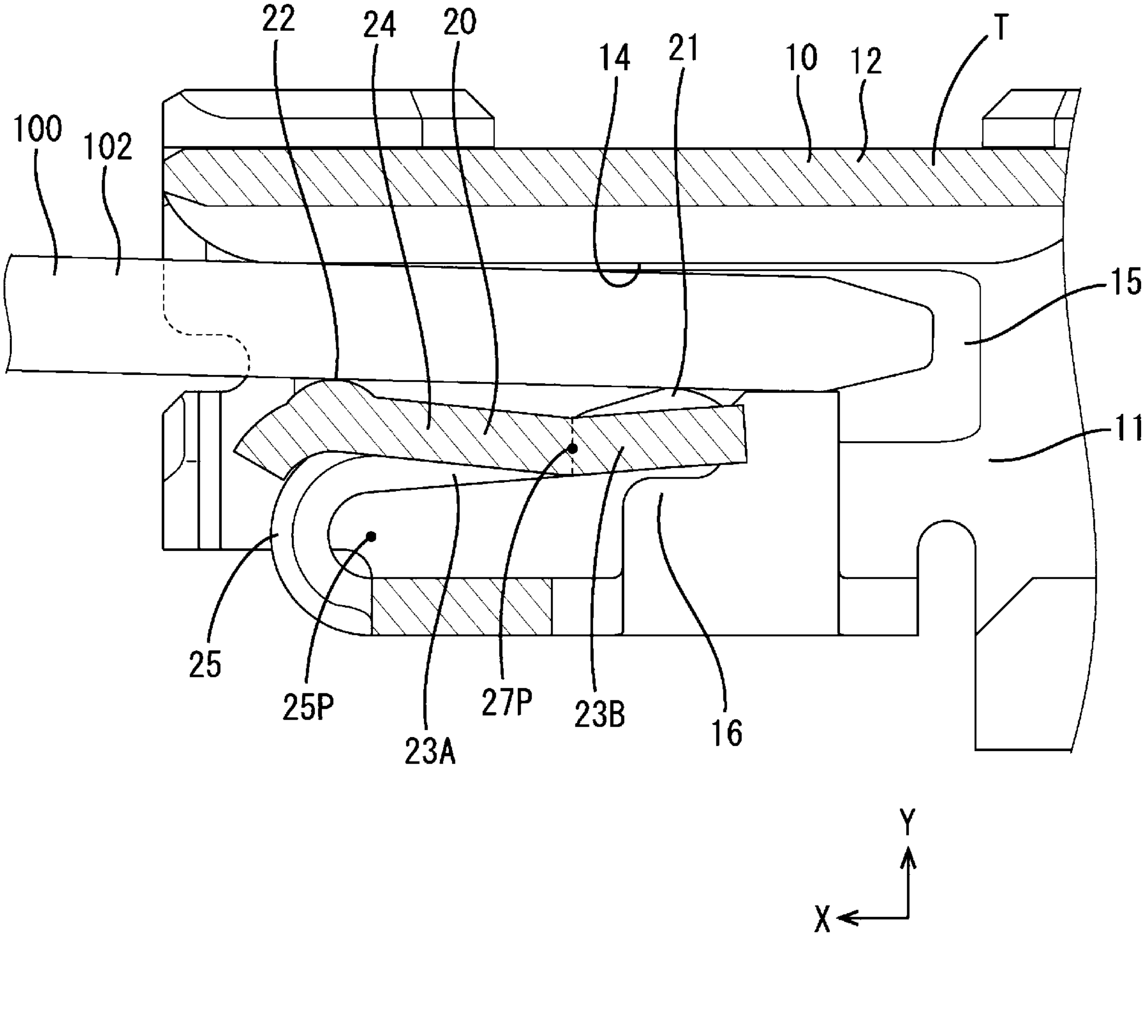
FIG. 7 is a section showing the inside of the body portion in a state where a tip side of the tab portion is displaced downward.

FIG. 7 shows a state where the tip side of the tab portion 102 is displaced downward. In this state, the first contact point portions 21 are displaced downward with the fulcrum 25P of the first fixed end 25 as a center. Contact loads of the first contact point portions 21 increase by being pressed by the tab portion 102. On the other hand, the second contact point portion 22 is displaced upward with the fulcrum 25P of the first fixed end 25 as a center by a seesaw effect associated with a resilient displacement of the first resilient piece 23. In this way, a reduction in the contact load of the second contact point portion 22 can be suppressed.

Figure 8:
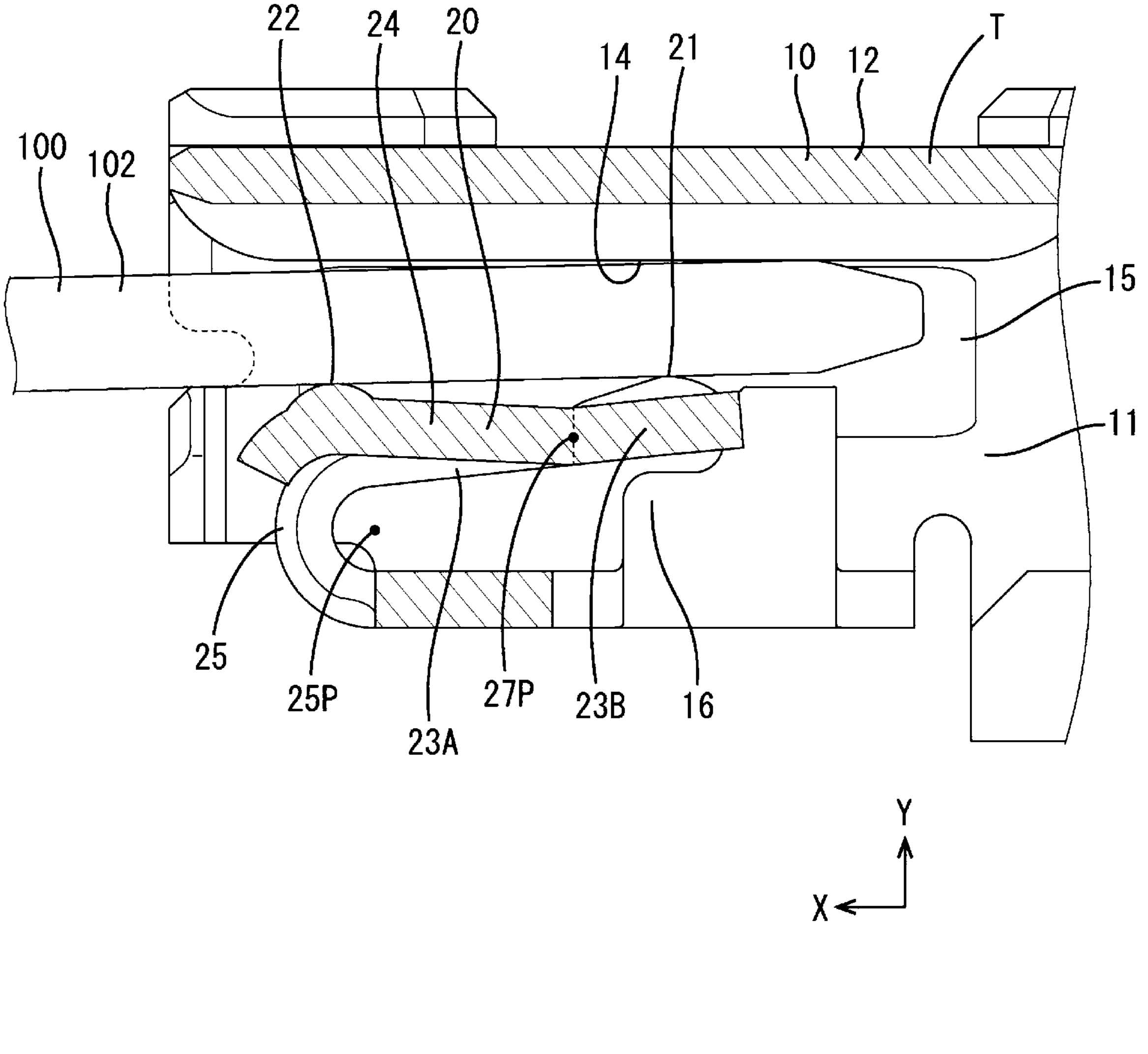
FIG. 8 is a section showing the inside of the body portion in a state where a rear side of the tab portion is displaced downward.

FIG. 8 shows a state where the rear side of the tab portion 102 is displaced downward. In this state, the second contact point portion 22 is displaced downward with the fulcrum 27P of the second fixed end 27 as a center. A contact load of the second contact point portion 22 increases by being pressed by the tab portion 102. On the other hand, the first contact point portions 21 are displaced upward with the fulcrum 27P of the second fixed end 27 as a center by a seesaw effect associated with a resilient displacement of the second resilient piece 24. In this way, a reduction in the contact loads of the first contact point portions 22 can be suppressed.

As just described, even if the tab portion 102 vertically vibrates, the contact loads of the three contact point portions 21, 22 do not decrease, wherefore a sliding movement of the tab portion 102 can be suppressed.

Figure 9:
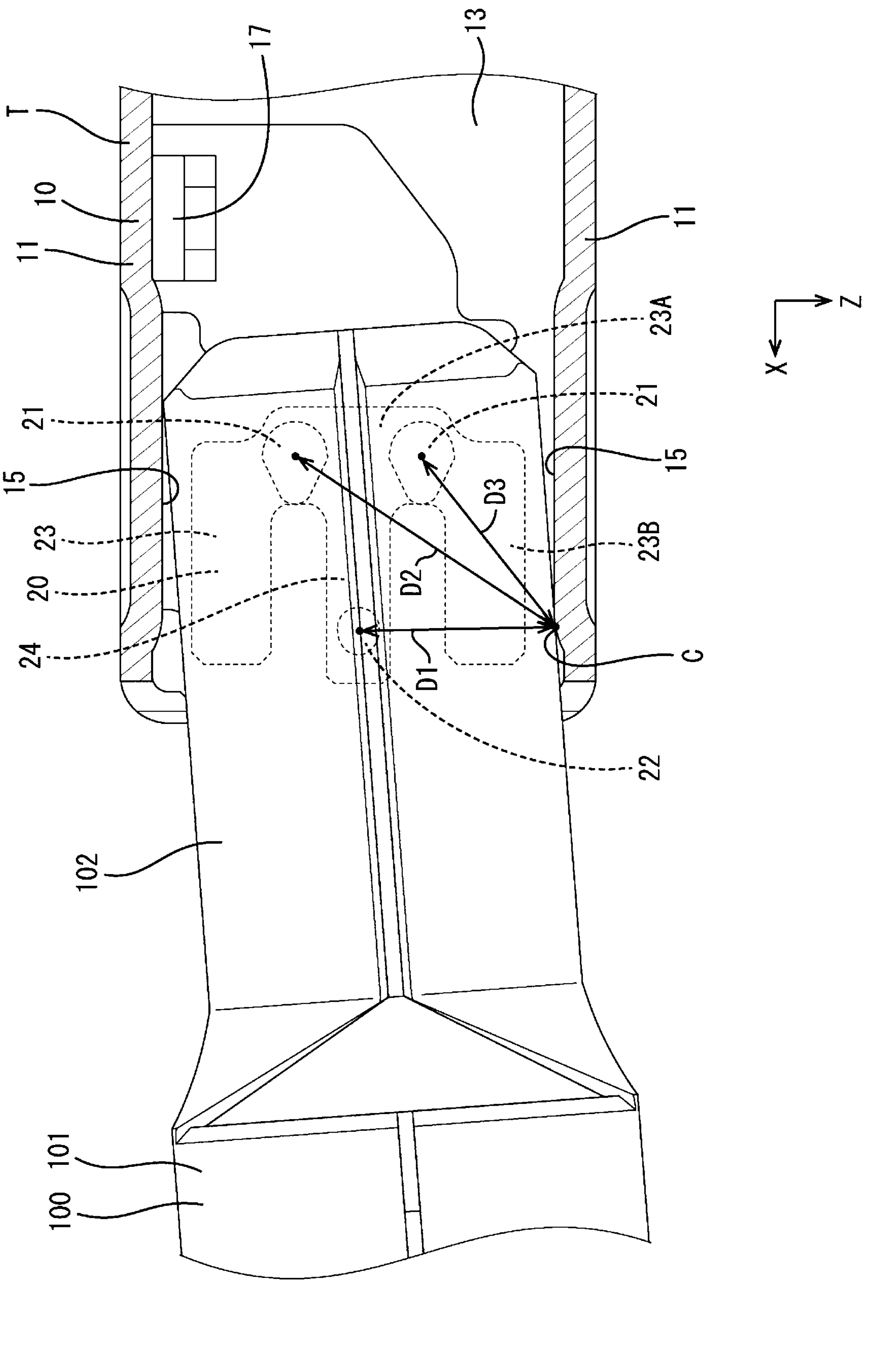
FIG. 9 is a plan view showing the inside of the body portion in a state where the tip side of the tab portion is displaced leftward.

With the terminal fitting T and the mating terminal fitting 100 properly connected, the tab portion 102 may laterally swing. As shown in FIG. 9, the lateral swing of the tab portion 102 means the inclination of the tip side of the tab portion 102 to be located more leftward or rightward than the side behind the tip side of the tab portion 102 in a virtual horizontal plane (XZ plane). FIG. 9 shows a state where the tip side of the tab portion 102 is located more leftward than the rear side of the tab portion 102. In this state, the right edge of the tab portion 102 contacts the projecting portion 15 of the body portion 10. A contact point C of the tab portion 102 and the projecting portion 15 serves as a center of the swing of the tip side of the tab portion 102. The sum of distances D1, D2 and D3 between the contact point C and the respective contact point portions 21, 22 is larger than in the case where the center of the shake of the tip side of the tab portion 102 is located inside the three contact point portions 21, 22. Thus, a load necessary to laterally swing the tip side of the tab portion 102 is larger than in this case. Therefore, connection reliability can be improved by suppressing the lateral swing of the tab portion 102. The distances D1, D2 and D3 are shortest distances between the contact point C and the tops of the respective contact point portions 21, 22 in the virtual horizontal plane (XZ plane).

Next, functions and effects of the embodiment configured as described above are described. The terminal fitting T includes the body portion 10, the first and second resilient pieces 23, 24, the first contact point portions 21 and the second contact point portion 22. The body portion 10 is tubular. The first and second resilient pieces 23, 24 are provided inside the body portion 10. The first contact point portions 21 are provided on the first resilient piece 23 and contact the tab portion 102 of the mating terminal fitting 100. The second contact point portion 22 is provided on the second resilient piece 24 and contacts the tab portion 102. The first resilient piece 23 extends rearward (in the length direction of the tab portion 102) from the first fixed end 25 fixed to the body portion 10 and is resiliently displaceable with the fulcrum 25P of the first fixed end 25 as a center. The second resilient piece 24 extends forward from the second fixed end 27 fixed to the first resilient piece 23 and is resiliently displaceable with the fulcrum 27P of the second fixed end 27 as a center. The first contact point portions 21 are located rearward of the fulcrum 27P of the second fixed end 27. The second contact point portion 22 is located forward of the fulcrum 25P of the first fixed end 25.

According to this configuration, if the tab portion 102 is displaced in a direction to press the first contact point portions 21, the first resilient piece 23 can be mainly resiliently displaced with the fulcrum 25P of the first fixed end 25 as a center and the second contact point portion 22 can be displaced toward the tab portion 102 like a seesaw. Thus, a reduction in the contact load of the tab portion 102 and the second contact point portion 22 can be suppressed. On the other hand, if the tab portion 102 is displaced in a direction to press the second contact point portion 22, the second resilient piece 24 can be mainly resiliently displaced with the fulcrum 27P of the second fixed end 27 as a center and the first contact point portions 21 can be displaced toward the tab portion 102 like a seesaw. Thus, a reduction in the contact loads of the tab portion 102 and the first contact point portions 21 can be suppressed. Therefore, even if the tab portion 102 is displaced in the direction to press either the first contact point portions 21 or the second contact point portion 22, a reduction in the contact load(s) of the contact point portion(s) 21, 22 can be reduced.

The first resilient piece 23 includes the two extending portions 23A extending in the front-rear direction and the linking portion 23B linking the rear end sides of the two extending portions 23A. The two first contact point portions 21 are provided on the linking portion 23B. According to this configuration, since the interval between the extending portions 23A of the first resilient piece 23 can be made smaller than that between the first contact point portions 21, a tab portion having a small width can be dealt with.

The body portion 10 includes the side walls 11 arranged on both lateral sides of the tab portion 102. The side walls 11 include the projecting portions 15 projecting toward the first and second resilient pieces 23, 24. According to this configuration, if the tip side of the tab portion 102 laterally swings, the side edge of the tab portion 102 contacts the projecting portion 15 and the contact point C of the side edge of the tab portion 102 and the projecting portion 15 serves as a center of a swinging movement of the tip of the tab portion 102. In this way, the distances between the respective contact points 21, 22 and the center (contact point C) of the swinging movement can be larger than those when a center of a swinging movement of a tab portion is located inside a plurality of contact point portions. Therefore, a load necessary to swing the tip of the tab portion 102 can be increased, wherefore the swinging movement of the tip of the tab portion 102 can be suppressed.

Other Embodiments of Present Disclosure

The embodiment disclosed this time should be considered illustrative in all aspects, rather than restrictive.

In the case of the above embodiment, the resilient piece 23 includes two extending portions 23A. As another embodiment, a first resilient piece may include only one extending portion or may include three or more extending portions. If the first resilient piece includes only one extending portion, a linking portion may not be provided.

In the case of the above embodiment, the resilient piece 20 includes one second resilient piece 24. As another embodiment, a resilient piece may include two or more second resilient pieces.

In the case of the above embodiment, the first resilient piece 23 extends rearward from the first fixed end 25 fixed to the body portion 10 and the second resilient piece 24 extends forward from the second fixed end 27 fixed to the first resilient piece 23. As another embodiment, extending directions of the first resilient piece and the second resilient piece may be reversed in the front-rear direction. Specifically, the first resilient piece may extend forward from the first fixed end fixed to the body portion and the second resilient piece may extend rearward from the second fixed end fixed to the first resilient piece.

In the case of the above embodiment, the fulcrum 25P of the first fixed end 25 is a center point of the first fixed end 25 and the fulcrum 27P of the second fixed end 27 is located on an extension of the front edge 26A of the linking portion 23B. As another embodiment, a first fixed end and a second fixed end may be formed differently from those of the above embodiment. The position of a fulcrum of the first fixed end and that of a fulcrum of the second fixed end are changed depending on the forms of the first and second fixed ends.

In the case of the above embodiment, the left and right side walls 11 include the projecting portions 15. As another embodiment, left and right side walls may not include projecting portions. Only either one of left and right side walls may include a projecting portion.

In the case of the above embodiment, the first contact point portions 21 are provided on the linking portion 23B. As another embodiment, first contact point portions may be provided on extending portions of a first resilient piece.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal fitting, comprising:

a tubular body portion;

a first resilient piece and a second resilient piece provided inside the body portion;

a first contact point portion provided on the first resilient piece, the first contact point portion contacting a tab portion of a mating terminal fitting; and a second contact point portion provided on the second resilient piece, the second contact point portion contacting the tab portion, wherein:

the first resilient piece extends in a first direction along a length direction of the tab portion from a first fixed end fixed to the body portion and is resiliently displaceable with a fulcrum of the first fixed end as a center, the second resilient piece extends in a second direction opposite to the first direction from a second fixed end fixed to the first resilient piece and is resiliently displaceable with a fulcrum of the second fixed end as a center, the first contact point portion is located on a side closer to a tip in the first direction of the first resilient piece than the fulcrum of the second fixed end, and the second contact point portion is located on a side closer to a tip in the second direction of the second resilient piece than the fulcrum of the first fixed end.

2. The terminal fitting of claim 1, wherein:

the first resilient piece includes a plurality of extending portions extending in the first direction and a linking portion linking tip sides in the first direction of the plurality of extending portions, and a plurality of the first contact point portions are provided on the linking portion.

3. The terminal fitting of claim 1, wherein:

the body portion includes side walls arranged on both sides of the tab portion in a direction intersecting the length direction, and the side walls include projecting portions projecting toward the first and second resilient pieces.

* * * * *